(12) United States Patent
Williams et al.

(10) Patent No.: US 10,970,762 B2
(45) Date of Patent: Apr. 6, 2021

(54) SYSTEMS AND METHODS FOR FACILITATING ELECTRONIC COMMERCE OVER A NETWORK

(71) Applicant: EBAY INC., San Jose, CA (US)

(72) Inventors: Brian F. Williams, San Carlos, CA (US); Luke Peacock, Fremont, CA (US)

(73) Assignee: eBay Inc., San Jose, CA (US)

( * ) Notice: Subject to any disclaimer, the term of this patent is extended or adjusted under 35 U.S.C. 154(b) by 855 days.

(21) Appl. No.: 15/350,555

(22) Filed: Nov. 14, 2016

(65) Prior Publication Data

US 2017/0061510 A1 Mar. 2, 2017

Related U.S. Application Data

(63) Continuation of application No. 12/635,402, filed on Dec. 10, 2009, now Pat. No. 9,495,697.

(51) Int. Cl.
*G06Q 30/06* (2012.01)
*H04W 12/08* (2021.01)
*G06F 3/0484* (2013.01)
*H04L 29/06* (2006.01)

(52) U.S. Cl.
CPC ..... *G06Q 30/0603* (2013.01); *G06F 3/04842* (2013.01); *G06F 3/04845* (2013.01); *G06Q 30/0609* (2013.01); *H04L 63/08* (2013.01); *H04L 63/102* (2013.01); *H04W 12/08* (2013.01); *H04L 2463/102* (2013.01)

(58) Field of Classification Search
CPC .... G06F 3/0481; G06F 3/0482; G06F 3/0483; G06F 3/04817; G06F 17/30873; G06F 17/30899; H04L 29/0809; H04L 29/08072; G06Q 30/02
See application file for complete search history.

(56) References Cited

U.S. PATENT DOCUMENTS

| 5,583,565 | A | * | 12/1996 | Cortjens | ............ H04N 5/23203 |
| | | | | | 348/14.1 |
| 5,708,845 | A | | 1/1998 | Wistendahl | |
| 6,139,197 | A | * | 10/2000 | Banks | ................ H04N 1/00283 |
| | | | | | 348/E7.071 |

(Continued)

OTHER PUBLICATIONS

U.S. Appl. No. 12/635,402, Adivosry Acton dated Jun. 14, 2016, 3 pages.

(Continued)

*Primary Examiner* — Ryan Barrett
*Assistant Examiner* — Erik V Stitt
(74) *Attorney, Agent, or Firm* — FIG. 1 Patents

(57) ABSTRACT

In accordance with embodiments of the present disclosure, systems and methods for facilitating electronic commerce over a network include communicating with a plurality of users via a plurality of user devices over the network, receiving a login request from a first user via a first user device over the network, accessing an account related to the user based on information passed with the login request, receiving a snaplist file related to a multiple image listing provided by the first user via the first user device, processing the snaplist file by extracting the multiple image listing from the snaplist file, and displaying the multiple image listing to one or more other users via one or more other user devices.

20 Claims, 8 Drawing Sheets

Input Description to User Device

(56) References Cited

U.S. PATENT DOCUMENTS

| | | | |
|---|---|---|---|
| 7,007,076 B1 | 2/2006 | Hess et al. | |
| 7,502,036 B2 | 3/2009 | Kramer et al. | |
| 7,746,376 B2 | 6/2010 | Mendoza et al. | |
| 7,783,620 B1 | 8/2010 | Zhang et al. | |
| 7,991,646 B2 | 8/2011 | Lewis et al. | |
| 7,995,090 B2 * | 8/2011 | Liu | H04N 7/147 348/14.01 |
| 8,042,064 B2 | 10/2011 | Cardu | |
| 8,117,548 B1 | 2/2012 | Ragan | |
| 8,261,179 B2 | 9/2012 | Hinson | |
| 8,302,013 B2 | 10/2012 | Garcia et al. | |
| 8,321,293 B2 * | 11/2012 | Lewis | G06Q 30/0601 705/26.1 |
| 8,456,491 B2 * | 6/2013 | Abrahamsson | G11B 27/105 345/666 |
| 8,601,392 B2 | 12/2013 | Audet | |
| 8,825,660 B2 * | 9/2014 | Chittar | G06F 16/5854 707/741 |
| 8,949,287 B2 | 2/2015 | Hull | |
| 8,990,737 B2 | 3/2015 | Ragan | |
| 9,495,697 B2 | 11/2016 | Williams et al. | |
| 9,639,505 B2 * | 5/2017 | Lanahan | G06F 16/43 |
| 9,747,622 B1 * | 8/2017 | Johnson | G06Q 30/0601 |
| 2002/0033837 A1 | 3/2002 | Munro | |
| 2002/0085219 A1 | 7/2002 | Ramamoorthy | |
| 2003/0083957 A1 | 5/2003 | Olefson | |
| 2003/0197785 A1 * | 10/2003 | White | G11B 27/034 348/207.99 |
| 2005/0028221 A1 * | 2/2005 | Liu | H04N 7/15 725/133 |
| 2006/0268007 A1 | 11/2006 | Gopalakrishnan | |
| 2007/0208751 A1 * | 9/2007 | Cowan | G06Q 10/10 |
| 2008/0108345 A1 * | 5/2008 | Calin | H04W 16/00 455/424 |
| 2008/0118157 A1 * | 5/2008 | Takayama | H04N 7/18 382/195 |
| 2008/0246840 A1 * | 10/2008 | Larson | H04N 7/181 348/143 |
| 2009/0012878 A1 | 1/2009 | Tedesco et al. | |
| 2009/0031246 A1 | 1/2009 | Cowtan et al. | |
| 2009/0070675 A1 | 3/2009 | Li | |
| 2009/0089707 A1 * | 4/2009 | Knowles | G06F 3/0481 715/800 |
| 2009/0099853 A1 * | 4/2009 | Lemelson | G06Q 30/02 705/319 |
| 2009/0106127 A1 * | 4/2009 | Purdy | G06Q 30/0601 705/26.1 |
| 2010/0053342 A1 * | 3/2010 | Hwang | H04N 5/2259 348/207.99 |
| 2010/0115462 A1 | 5/2010 | Spencer et al. | |
| 2010/0131388 A1 * | 5/2010 | Law | G06Q 30/0277 705/26.1 |
| 2010/0231504 A1 | 9/2010 | Bloem et al. | |
| 2010/0299630 A1 * | 11/2010 | McCutchen | G06F 16/7844 715/803 |
| 2011/0145713 A1 | 6/2011 | Williams et al. | |
| 2012/0154633 A1 * | 6/2012 | Rodriguez | H04M 1/72569 348/231.99 |
| 2012/0209965 A1 * | 8/2012 | Rothschild | G06F 16/434 709/219 |
| 2012/0246184 A1 | 9/2012 | Rothschild | |
| 2013/0215116 A1 * | 8/2013 | Siddique | G06Q 20/204 345/420 |
| 2013/0339197 A1 * | 12/2013 | Lewis | G06Q 30/0601 705/27.1 |
| 2016/0078506 A1 * | 3/2016 | Sesti | G06Q 30/0643 705/27.2 |
| 2017/0195550 A1 * | 7/2017 | Kim | G06F 3/04817 |

OTHER PUBLICATIONS

U.S. Appl. No. 12/635,402, Amendment and Response filed Mar. 23, 2012, 12 pages.
U.S. Appl. No. 12/635,402, Amendment and Response filed Jun. 29, 2012, 12 pages.
U.S. Appl. No. 12/635,402, Amendment and Response filed Apr. 3, 2013, 14 pages.
U.S. Appl. No. 12/635,402, Amendment and Response filed Sep. 18, 2013, 13 pages.
U.S. Appl. No. 12/635,402, Amendment and Response filed Jan. 9, 2014, 13 pages.
U.S. Appl. No. 12/635,402, Amendment and Response filed Aug. 4, 2014, 13 pages.
U.S. Appl. No. 12/635,402, Amendment and Response filed Feb. 6, 2015, 12 pages.
U.S. Appl. No. 12/635,402, Amendment and Response filed Jul. 21, 2015, 13 pages.
U.S. Appl. No. 12/635,402, Amendment and Response filed Nov. 3, 2015, 14 pages.
U.S. Appl. No. 12/635,402, Amendment and Response filed May 11, 2016, 11 pages.
U.S. Appl. No. 12/635,402, Notice of Allowance dated Jul. 5, 2016, 8 pages.
U.S. Appl. No. 12/635,402, Office Action dated Dec. 29, 2011, 11 pages.
U.S. Appl. No. 12/635,402, Office Action dated Apr. 6, 2012, 12 pages.
U.S. Appl. No. 12/635,402, Office Action dated Jan. 4, 2013, 11 pages.
U.S. Appl. No. 12/635,402, Office Action dated Jun. 18, 2013, 12 pages.
U.S. Appl. No. 12/635,402, Office Action dated Oct. 9, 2013, 12 pages.
U.S. Appl. No. 12/635,402, Office Action dated Nov. 6, 2014, 11 pages.
U.S. Appl. No. 12/635,402, Office Action dated Apr. 21, 2015, 13 pages.
U.S. Appl. No. 12/635,402, Office Action dated Aug. 3, 2015, 13 pages.
U.S. Appl. No. 12/635,402, Office Action dated Feb. 11, 2016, 15 pages.
U.S. Appl. No. 12/635,402, Office Action dated Jun. 14, 2016, 3 pages.
ebay.com, About ebay Picture Hosing, Jul. 5, 2008, pp. 1-2.
ebay.com, Adding Pictures to Your ebay Listing, May 18, 2008, pp. 1-2.
ebay.com, Changing Your Listing, Jul. 20, 2008, pp. 1-3.
Applicant Initiated Interview Summary received for U.S. Appl. No. 12/635,402, dated Nov. 5, 2015, 3 pages.
Final Office Action received for U.S. Appl. No. 12/635,402, dated May 6, 2014, 12 pages.

* cited by examiner

Item Detail

SYSTEMS AND METHODS FOR FACILITATING ELECTRONIC COMMERCE OVER A NETWORK

CROSS-REFERENCE TO RELATED APPLICATIONS

This application is a continuation of U.S. patent application Ser. No. 12/635,402, filed Dec. 10, 2009, all of which is hereby incorporated by reference in its entirety.

BACKGROUND

Technical Field

The present invention generally relates to network transactions and, more particularly, to facilitating electronic commerce over a network.

Related Art

In electronic commerce exchange, a user typically lists merchandise for sale through electronic communications with online service providers over communication networks, such as the Internet. The online service provider typically provides a user interface that allows a user to upload pictures and item descriptions via a personal computing device, such as a desktop computer or laptop computer. During the course of listing items for sale, the user is often directed through a series of multiple webpages with each webpage requiring different types of information to be inputted. For example, there may be a login page, a listing request page, a item description page, an image upload page, a preview page, an authorization page, a conformation page, etc. Unfortunately, this conventional item listing process is often time-consuming and inconvenient for the user. Accordingly, there exists a need to simplify the process of item listing over a network.

SUMMARY

Embodiments of the present disclosure are directed to systems and methods for facilitating electronic commerce over a communication network. In various embodiments, a mobile communication device having an image capture component and a network connection is adapted to generate visually compelling multiple image listings directly from the mobile communication device.

In accordance with an embodiment, a system for facilitating electronic commerce over a network includes a first component adapted to communicate with a plurality of users via a plurality of user devices over the network and a second component adapted to receive a login request from a first user via a first user device over the network, access an account related to the user based on information passed with the login request, receive a snaplist file related to a multiple image listing provided by the first user via the first user device, process the snaplist file by extracting the multiple image listing from the snaplist file, and displaying the multiple image listing to one or more other users via one or more other user devices.

In one implementation, the first user device comprises a mobile phone having a camera. In another implementation, the first user device comprises a user interface application adapted to allow the first user to communicate with the first component via the network and upload the snaplist file, an image capture component (e.g., a camera) adapted to capture images of an item for sale, an input component adapted to receive user inputted textual descriptions of each captured image, a snaplist file creation module adapted to allow the first user to generate a multiple image listing with one or more captured images and user inputted textual descriptions of each captured image, and a display component adapted to display the generated multiple image listings to at least the first user. In various implementations, the network comprises a mobile communication network adapted to communicate with the Internet, and the system comprises a network server adapted to communicate with the first user device and the other user devices over the network.

In accordance with an embodiment, a method for facilitating transactions over a network includes communicating with a plurality of users via a plurality of user devices over the network, receiving a login request from a first user via a first user device over the network, accessing an account related to the user based on information passed with the login request, receiving a snaplist file related to a multiple image listing provided by the first user via the first user device, processing the snaplist file by extracting the multiple image listing from the snaplist file, and displaying the multiple image listing to one or more other users via one or more other user devices.

These and other features and advantages of the present disclosure will be more readily apparent from the detailed description of the embodiments set forth below taken in conjunction with the accompanying drawings.

Figure 1:
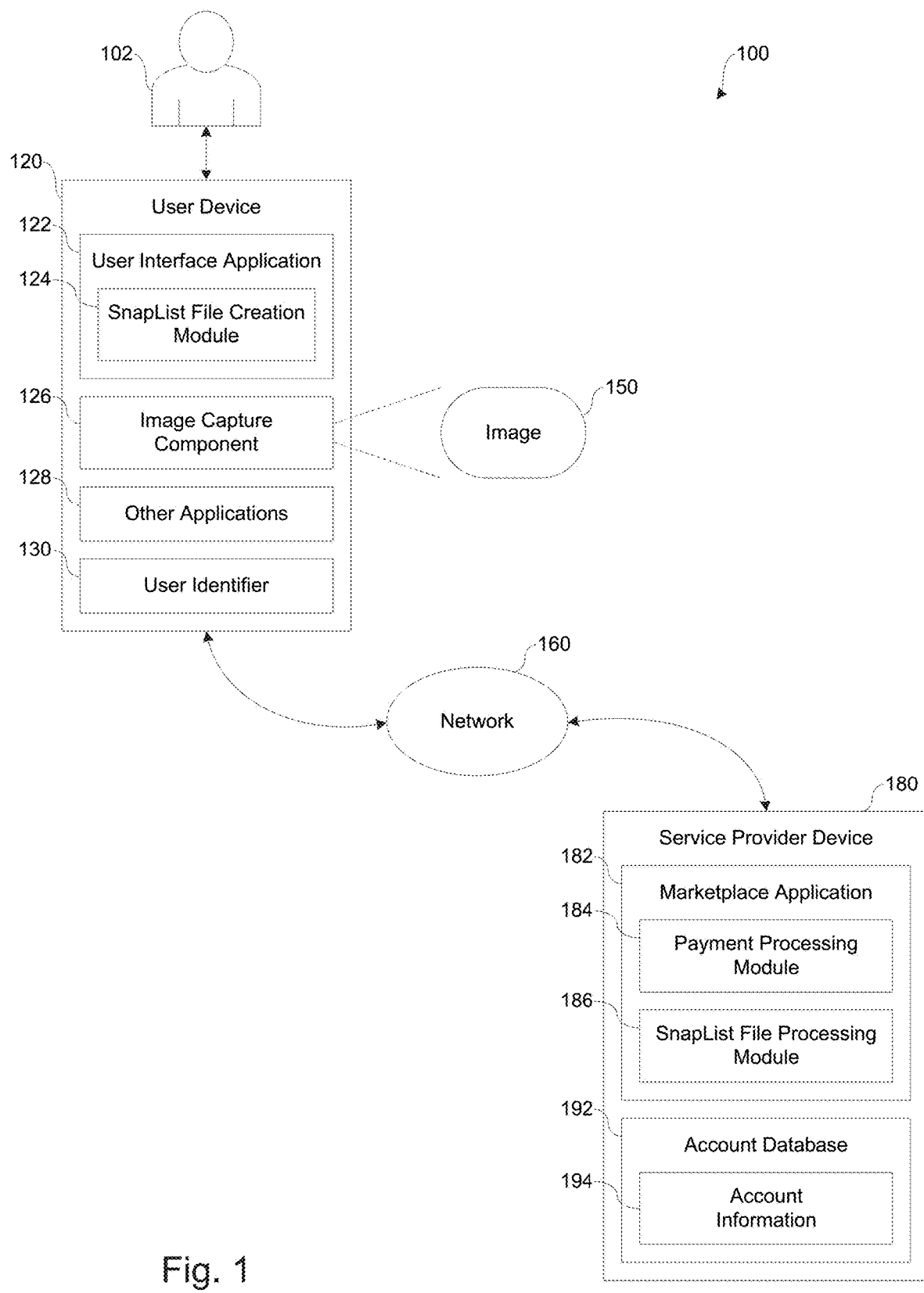
FIG. 1 shows a block diagram of a system adapted to facilitate electronic commerce over a network, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure are directed to systems and methods for facilitating electronic commerce over a communication network, such as the Internet. In various implementations, a mobile communication device (e.g., a cell phone) having an image capture component (e.g., a camera) and a network connection (e.g., web or Internet connection) is adapted to generate rich, multiple image listings directly from the mobile communication device. This allows a user of the mobile communication device to easily create visually compelling multiple image listings for posting on a network. These and other aspects of the present disclosure are described in greater detail herein.

FIG. 1 shows one embodiment of a block diagram of a system 100 adapted to facilitate electronic commerce over a network 160. As shown in FIG. 1, the system 100 includes at least one user device 120 (e.g., network communication device, such as a mobile phone) and at least one service provider device 180 (e.g., network communication device, such as a server) in communication over the network 160. In various implementations, the user device 120 functions as a mobile phone camera with a network connection adapted to create visually compelling multiple image listings directly from the user device 120.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120 and service provider device 180 may be associated with a particular network link (e.g., a link, such as a URL (Uniform Resource Locator) to an IP (Internet Protocol) address) and/or a mobile phone number.

The user device 120, in various embodiments, may be implemented utilizing any appropriate combination of hardware and/or software configured for wired and/or wireless communication over the network 160. In one embodiment, the user device 120 may be implemented as a mobile telephone (e.g., cellular phone) and/or various other generally known types of wireless communication devices in communication with the network 160. In various other embodiments, the user device 120 may be implemented as a personal computer (PC), a personal digital assistant (PDA), a notebook computer, and/or various other generally known types of wired and/or wireless computing devices in communication with the network 160. In one implementation, the user device 120 operates as an image capture device with a network connection adapted to directly generate multiple image listings. It should be appreciated that the user device 120 may be referred to as a client device or a customer device without departing from the scope of the present disclosure.

The user device 120, in one embodiment, includes a user interface application 122, which may be utilized by a user 102 to conduct electronic commerce (e.g., listing, shopping, purchasing, bidding, etc.) with the service provider device 180 over the network 160. For example, the user interface application 122 may be implemented as an listing application to create, list, store, track, and manage information related to items, products, and/or services proffered for sale over the network 160. In one example, the user interface application 122 utilizes a snaplist file creation module 124 adapted to assist the user 102 with creating multiple image listings with the user device 120, such as a mobile phone. These and other aspects of the present disclosure are described in greater detail herein.

In one implementation, the user interface application 122 comprises a software program, such as a graphical user interface (GUI), executable by a processor that is configured to interface and communicate with the service provider device 180 via the network 160. In another implementation, the user interface application 122 comprises a network browser module that provides a network interface to browse information available over the network 160. For example, the user interface application 122 may be implemented, in part, as a web browser to view information available over the network 160. In another example, the user 102 is able to access the service provider device 180 to list items, products, and/or services for purchase via the network 160. Accordingly, the user 102 may conduct electronic commerce (e.g., list and proffer items, products, and/or services for purchase) from the service provider device 180 via the network 160.

The user device 120, in one embodiment, may include an image capture component 126 (e.g., a digital camera) adapted to interface with the user interface application 122 and the snaplist file creation module 124 to capture, store, and utilize one or more images, such as image 150. The image capture component 126 may represent any type of digital camera, which for example detects visible light and provides representative data (e.g., one or more snapshots or video images). The image capture component 126 may comprise a portable imaging device and be incorporated into the user device 120 (e.g., a mobile phone). In one aspect, the user device 120 operates as a mobile phone with the image capture component 126 (e.g., a digital camera) in communication with the network 160, which is adapted to generate multiple image listings directly from the user device 120.

The image capture component 130 comprises, in one embodiment, visible light sensors for capturing image signals representative of an image, such as image 150. In one example, the visible light sensors of image capture component 130 provide for representing (e.g., converting) the captured image signal as digital data and/or information. It should be appreciated that image 150 may comprise any type of image including an image representing an item, product, service, scene, portrait, etc. In one aspect, the user device 120 comprises a processing component adapted to convert the captured infrared image signals into image data and information, store the image data and information in a memory component, and retrieve stored image data and information from the memory component. The processing component is adapted to process image data and information stored in the memory component, and the image data and information may include captured image data and information and/or processed image data and information.

The user device 120, in various embodiments, may include other applications 128 as may be desired in one or more embodiments of the present disclosure to provide additional features available to the user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122, the snaplist file creation module, and the image capture component 124 for improved efficiency and convenience. For example, files, data, and/or information may be imported from various types of image processing software directly into the user interface application 122 for improved display and organization of capture images.

The user device 120, in one embodiment, may include at least one user identifier 130, which may be implemented, e.g., as operating system registry entries, cookies associated with the user interface application 122, identifiers associated with hardware of the user device 120, identifiers associated with images, identifiers associated with user generated snaplist files, and/or various other appropriate identifiers. The user identifier 130 may include one or more attributes related to the user 102, such as personal information related to the user 102 (e.g., one or more usernames, passwords, biometric ids, addresses, phone numbers, etc.) and/or account information (e.g., one or more banking institutions, credit card issuers, user account numbers, security data and information, etc.). In various aspects, the user identifier 130 may be passed with a user login request to the service provider device 180 via the network 160, and the user identifier 130 may be used by the service provider device 180 to associate the user 102 with a particular user account maintained by the service provider device 180, in a manner as described herein.

The service provider device 180, in one embodiment, is maintained by network based electronic commerce entity adapted to process financial transactions and/or information transactions on behalf of the user 102 over the network 160. In one implementation, the service provider device 180 includes a marketplace application 182 adapted to interact with the user device 120 over the network 160 to facilitate the listing and proffering of items, products, and/or services for sale by the user 102. In one example, the service provider device 180 may be provided by PayPal, Inc. and/or eBay of San Jose, Calif., USA.

The marketplace application 182, in one embodiment, utilizes a payment processing module 184 to process purchases and/or payments for financial transactions between network users including user 102 and, in some examples, merchants. In one implementation, the payment processing module 184 assists with resolving financial transactions through validation, delivery, and settlement. As such, the marketplace application 182 in conjunction with the payment processing module 184 settles indebtedness between users including user 102 and, in some examples, merchants, wherein user accounts may be directly and/or automatically debited and/or credited of monetary funds in a manner as accepted by the banking industry.

The marketplace application 182, in one embodiment, utilizes a snaplist file processing module 186 to process user generated snaplist files provided by the user device 120 via the network 160. In one aspect, the snaplist file processing module 186 allows the service provider device 180 to process user lists and images related to items, products and/or service proffered for sale. Further scope and function related to the snaplist file processing module 186 and the selection window is described in greater detail herein.

In accordance with one or more embodiments of the present disclosure, online and network-based business entities (e.g., market sites, merchant sites, resource information sites, utility sites, real estate management sites, social networking sites, etc.) offer items, products, and/or services for network users to view, select, monitor, compare, and/or purchase. The snaplist file processing module 186 provides a simple and efficient way to utilize a mobile phone camera (e.g., image capture component 126) and network connection to create rich, multiple image listings directly from mobile phone (e.g., the user device 120) and generate visually compelling listings in an effective manner.

The service provider device 180, in one embodiment, may be configured to maintain one or more user accounts and merchant accounts in an account database 192, each of which may include account information 194 associated with one or more individual users (e.g., user 102) and merchants. For example, account information 194 may include private financial information of the user 102 or merchant, such as one or more account numbers, passwords, credit card information, banking information, or other types of financial information, which may be used to facilitate electronic commerce transactions between users, including the user 102 and, in some examples, merchants. In various implementation, the methods and systems described herein may be modified to accommodate users and/or merchants that may or may not be associated with at least one existing account.

In one implementation, the user 102 may have identity attributes stored with the service provider device 180, and the user 102 may have credentials to authenticate or verify identity with the service provider device 180. User attributes may include personal information and banking information, as previously described. In various aspects, the user attributes may be passed to the service provider device 180 as part of a login, snaplist file, and/or some other related request, and the user attributes may be utilized by the service provider device 180 to associate the user 102 with one or more particular user accounts maintained by the service provider device 180.

Figure 2A:
FIG. 2A shows an illustration of capturing an image of an item with a user device, in accordance with an embodiment of the present disclosure.

FIG. 2A shows one embodiment of capturing an image 220 of an item 250 (e.g., a car) with the image capture component 126 of the user device 120. In one aspect, FIG. 2A shows the user device 120 displaying the captured image 220 of the item 250 to be listed for sale in a browser window 210 as displayed by the user interface application 122. In another aspect, FIG. 2A shows the image 220 in the browser window 210 with the snaplist file creation module 124 adapted to receive the image 220 as part of the snaplist file to be created. In various implementations, the user device 120 functions as a mobile phone with the image capture component 126 as, e.g., a camera, and a network connection to the service provider device 180 via network 160, which is adapted to be utilized by the user 102 to create visually compelling multiple image listings directly from the user device 120.

In one embodiment, referring to FIG. 2A, a display component of the user device 120 may be adapted to display, in a platform or environment of the user device 120, each image captured for placement in the snaplist file. In one implementation, referring to FIGS. 1 and 2A, the user 102 utilizes the user interface application 122 to run the snaplist file creation module 124 and begin the snaplisting process by capturing images for the snaplist file. When executed, the user interface application 122 is adapted to provide the browser window 210 in a platform or environment so that the user 102 may view the captured images prior to generating the snaplist file. Once the images are captured and accepted, the user 102 may then input a description 230 of each image captured 220, as shown in reference to FIG. 2B.

In one embodiment, referring to FIG. 2A, each captured image 220 may be displayed with a symbol (e.g., a '+' symbol) positioned over a particular part of the image, such as the hood of a car, as shown in FIG. 2A. In one aspect, after capturing an image, the image is adapted to allow a user to activate one or more parts of the image (e.g., by double-tapping a particular part of the image) and then capture one or more additional images related to the activated part of the original captured image. This feature allows a user to capture one or more summary images and then double-tap the image to capture one or more close-up images of a particular part of the original image to thereby highlight one or more details, textures, defects, etc. of the item for sale. That way, when the listed item is viewed by another user on the network, all images may be browsed linearly, or hotspots of an image may be selected for viewing close-up images related to that particular hotspot.

Figure 2B:
FIG. 2B shows an illustration of inputting a description for a captured image of an item with a user device, in accordance with an embodiment of the present disclosure.

FIG. 2B shows one embodiment of inputting a description 230 for the image 220 of the item 250 (e.g., a car) for listing as part of the snaplist file. In one aspect, FIG. 2B shows the user device 120 displaying the description 230 of the item 250 to be listed for sale in the browser window 210 as displayed by the user interface application 122. In another aspect, FIG. 2B shows the image description 230 in the browser window 210 with the snaplist file creation module 124 adapted to receive the image description 230 as part of the snaplist file to be created. In one embodiment, referring to FIG. 2B, a display component of the user device 120 may be adapted to display, in the platform or environment of the user device 120, a text input window 230 as part of the browser window 210 to input a textual description of each captured image 220. The image description 230 may include information related to the user (e.g., a username, address, phone number, etc.) and/or information related to the item for sale (e.g., year, make, model, color, etc.). It should be appreciated that the image description 230 may comprise one or more different formats, such as textual, audio, video, etc., without departing from the scope of the present disclosure.

Figure 2C:
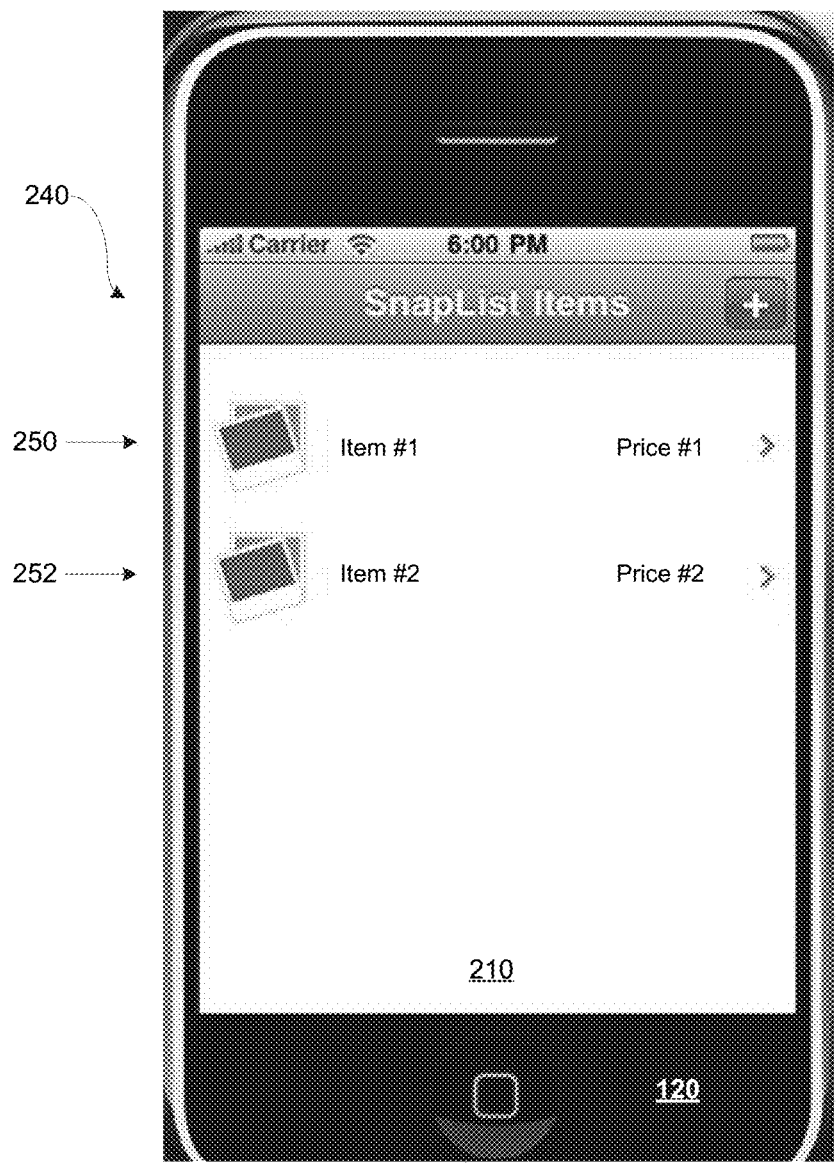
FIG. 2C shows an illustration of displaying a list of items with a display component of a user device, in accordance with an embodiment of the present disclosure.

FIG. 2C shows one embodiment of displaying a snaplist of one or more items (e.g., snaplist items #1 and #2) with a display component of the user device 120. As shown in FIG. 2C, the user device 120 may be adapted to display a list 240 of items to be listed for sale (e.g., snaplist items 250, 252) in the browser window 210 as displayed by the user interface application 122. In one aspect, the snaplist items may be displayed in the platform or environment of the user device 120 during the process of listing and/or after listing the items for sale. Accordingly, these features allow the user to capture images (e.g., photos, pictures, etc.) of an item and not necessarily commit to listing the item at that point in time. In another aspect, the snaplist is adapted to access descriptive information related to the snaplist item, such as a title, a thumbnail image, a suggested sale price, a date/time to list the item, an expiration date/time for listing termination, etc.

Figure 2D:
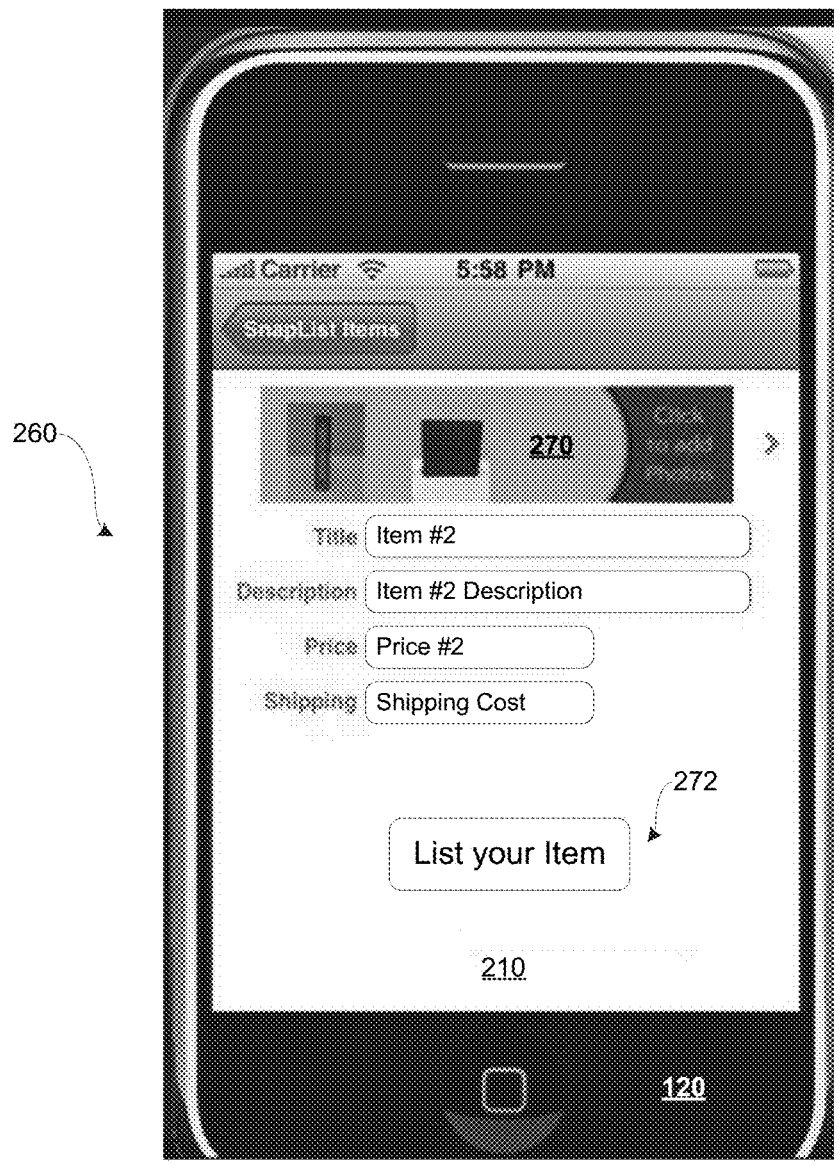
FIG. 2D shows an illustration of adding descriptive information to a listed item on a user device, in accordance with an embodiment of the present disclosure.

FIG. 2D shows one embodiment of adding descriptive information 260 related to a snaplist item. In one aspect, the user may select an item listed in the snaplist 240 of FIG. 2C, and a descriptive information page may be displayed to allow the user to input descriptive information 260 related to the selected snaplist item. Accordingly, each snaplist item may include a description with information needed to list the item for sale, such as, for example, an item title, an item description, an item price, etc. As shown in FIG. 2D, the descriptive information page may include a first user-activated button 270 adapted for capturing images related to the selected item, and the descriptive information page may include a second user-activated button 272 adapted for listing the item for sale.

Figure 3:
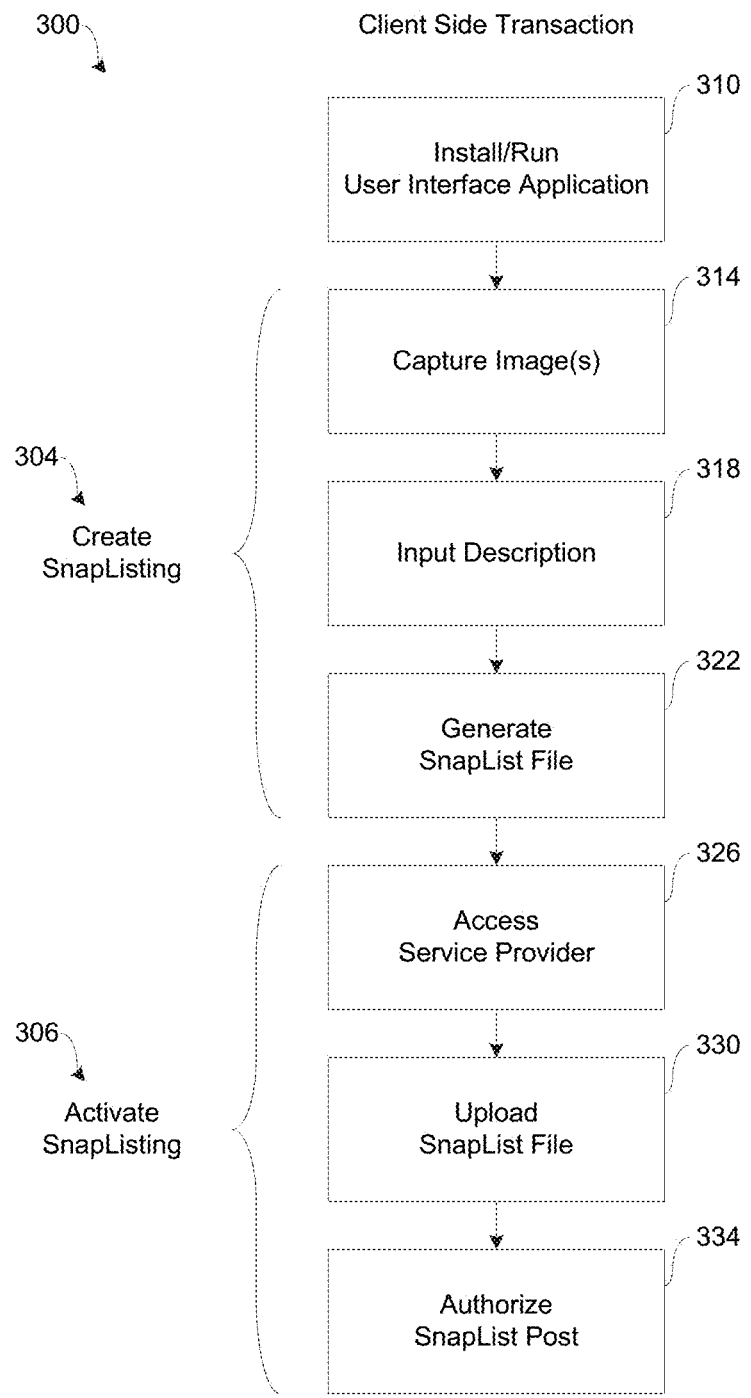
FIG. 3 shows a method for facilitating a client-side transaction over the network, in accordance with an embodiment of the present disclosure.

FIG. 3 shows one embodiment of a method 300 for facilitating electronic commerce over the network 160 with the user interface application 122 and snaplist file creation module 124 in reference to the user device 120. In one aspect, the user interface application 122 allows the user device 120 to create a snaplisting (i.e., snaplist file) of an item, product, and/or service for sale by capturing images and providing a textual description of the item, product, and/or service for sale. In another aspect, the user interface application 122 allows the user device 120 to communicate with the service provider device 180 via the network 160 to upload a generated snaplist file to the service provider device 180 to post in an electronic marketplace over the network 160.

In one implementation, upon user instruction, the user interface application 122 may be installed and/or run on the user device 120 (block 310). The user 102 may run the user interface application 122 on the user device 120 to create a snaplisting (304) by capturing one or more images of the item, product, and/or service for sale (block 314), inputting a textual description for each of the one or more captured images (block 318), and then generating the snaplist file from the data and information of the captured images and the inputted description (block 322).

In reference to capturing one or more images of the item, product, and/or service for sale (block 314), the user 102 runs the snaplist file creation module 124 via the user interface application 122 to capture one or more images of the item, product, and/or service for sale with the image capture component 126 of the user device 120. This allows the user 102 to capture an image, review the captured image, and then store the captured image in the user device 120 to be part of the snaplist file when created.

In reference to inputting a textual description for each of the one or more captured images (block 318), the user 102 inputs a textual description for each captured image via the snaplist file creation module 124 to provide a informative description of the item, product, and/or service for sale. This allows the user 102 to provide a description of each image, review the image description, and then store the image description as part of the image in the user device 120 to be part of the snaplist file when created. As previously mentioned, it should be appreciated that the image description may include one or more formats, such as textual, audio, video, etc., without departing from the scope of the present disclosure.

In reference to generating the snaplist file from the data and information of the captured images and the inputted description (block 322), the user 102 instructs the snaplist file creation module 124 to generate the snaplist file with data and information related to the one or more captured images and inputted descriptions thereof. In one aspect, the snaplist file is packaged by the snaplist file creation module 124 to transfer from the user device 120 to the service provider device 180 via the network 160.

Next, referring to method 300, the user 102 may utilize the user interface application 122 on the user device 120 to activate the snaplisting (326) by accessing the service provider device 180 (block 326), uploading the generated snaplist file from the user device 120 to the service provider device 180 (block 330), and authorizing the service provider device 180 to post the snaplist over the network 160 (block 334).

In reference to accessing the service provider device 180 (block 326), the user 102 may be prompted to provide a username and password via the user device 120 to access an account related to the user 102. If no account exists, the user 102 may be directed to establish a user account with the service provider device 180.

In reference to uploading the generated snaplist file from the user device 120 to the service provider device 180 (block 330), once the user account is located or established, the user 102 may then be allowed to upload a snaplist file from the user device 120 to the service provider device 180 via the network 160. The uploaded snaplist file may then be stored as part of the user account in the account database 192.

In reference to authorizing the service provider device 180 to post the snaplist over the network 160 (block 334), the user 102 provides authorization to post the snaplisting to the service provider device 180. The authorization may be sent to the service provider device 180 as part of the snaplist file, such as an electronic signature, password, security key, PIN number, etc. The authorization may comprise separate permission data and information sent as part of a communication, such as an email, text message, voice message, etc. In various aspects, the authorization may include username, password, calendar range for posting, price range, auction reserve amount, etc.

In one aspect, upon installation or execution of the user interface application 122, the user 102 may be prompted to establish a user account for login with the service provider device 180, wherein the user 102 may use the user interface application 122 and the user device 120 to access the service provider device 180 via the network 160. When establishing a user account, the user 102 may be asked to provide personal information, such as name, username, address, phone number, email address, etc., and financial information, such as banking information, credit card information, etc. In another aspect, referring to FIG. 1, information related to the user 102 may be packaged as the user identifier 130.

In one implementation, the user snaplist file includes user information and inputted item information embedded as arguments in an expression, which are passed to the service provider device 180. The user information may include user identifier information, and the inputted item information may include one or more image attributes, including item identifier information, having dynamic arguments identifying the item and image of the item. In one aspect, the user interface application 122 may transmit an item identifier along with the user identifier 130 and the snaplist file to the service provider device 180 for processing. In another aspect, it should be appreciated that user identification may be provided as the user identifier 130 and passed with the snaplist file to the service provider device 180.

Figure 4:
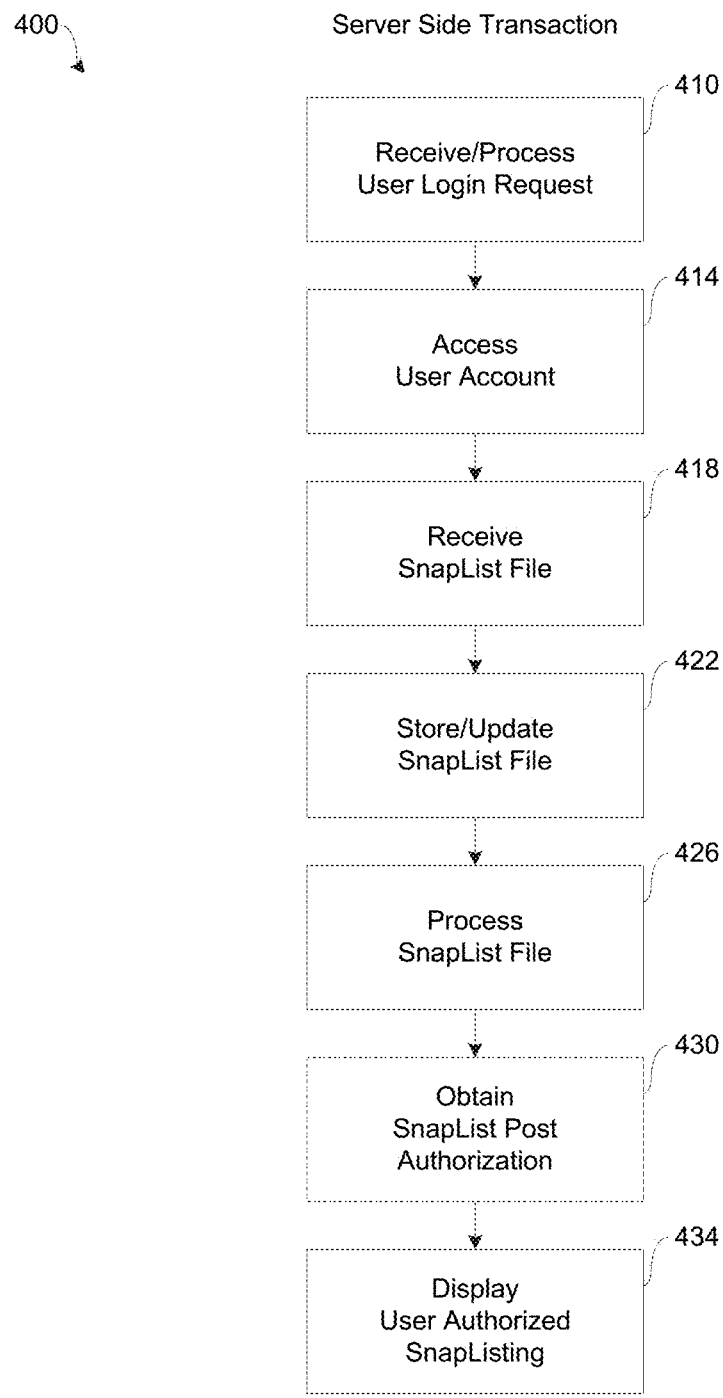
FIG. 4 shows a method for facilitating a server-side transaction over the network, in accordance with an embodiment of the present disclosure.

FIG. 4 shows one embodiment of a method 400 for facilitating server-side processing of a snaplist file received from the user device 120 via the network 160. In one aspect, the marketplace application 182 allows the service provider device 180 to communicate with the user interface application 122 of the user device 120 to receive and process snaplist files generated by the snaplist file generation module 124. The service provider device 180 is adapted to receive and process snaplist files on behalf of the user 102 in reference to items, products, and/or services proffered for sale by the user 102.

In one implementation, the service provider device 180 receives a login request from the user 102 via the user device 120 (block 410), and then the service provider device 180 processes the user login request (block 410). Next, upon receiving the user login request, the service provider device 180 attempts to locate and access an account related to the user 102 (block 414). In one aspect, if the user 102 is determined to be an existing user by the service provider device 180, then the service provider device 180 verifies the user account and user identification information provider by user 102 in the user login request.

In one aspect, the service provider device 180 may determine if the user account is current and active. In some instances, user account information may need to be updated, and therefore, the service provider device 180 may prompt the user 102 to update user account information 186 in the user account 184 for the user 102. However, if the user account 184 is current and active, then the service provider device 180 is adapted to receive the snaplist file sent from the user device 120 via the network (block 418), store or update the received snaplist file (block 422), and then process the snaplist file (block 426).

It should be appreciated by those skilled in the art that the service provider device 180 may cancel the user login request at any time during the process of method 400 if, e.g., it is determined by the service provider device 180 that the user 102 enters wrong information or the user 102 is trying to access an account with criminal intent.

In another aspect, upon receiving the user login request, the service provider device 180 may determine whether the user 102 is an existing user having an established user account by, e.g., checking a user account list in a account database 192. If the user 102 does not have an established user account, then the service provider device 180 may prompt the user 102 to establish a user account by providing user information including identification information, and the service provider device 180 may upload the user interface application 122 to the user device 120 so that the user 102 may install and run the user interface application 122 on the user device 120. Once the user interface application 122 is installed and run on the user device 120, then the service provider device 180 is adapted to receive snaplist files sent from the user device 120 via the network (block 418), store or update the received snaplist files (block 422), and then process the snaplist files (block 426).

In reference to receiving the snaplist file sent from the user device 120 via the network (block 418), the service provider device 180 is adapted to communicate with the user device 120 and receive the snaplist file as packaged by the snaplist file creation module 124 and as transferred by the user interface application 122. As previously mentioned, the snaplist file comprises data and information related to the one or more captured images and inputted descriptions thereof, which may be extracted and processed by the snaplist file processing module 186.

In reference to storing or updating the received snaplist file (block 422), the received snaplist file may be stored in the account database 192 as part of the accessed account related to the user 102. In one aspect, the received snaplist file may be stored in the account database 192 with an item identifier as location information. In another aspect, if a snaplist file already exists in the account database 192 and is related to the item in the snaplist file, which may be recognizable via an item identifier, then the already stored snaplist file may be updated with new and/or additional data and information in the received snaplist file.

In reference to processing the snaplist file (block 426), data and information related to the one or more captured images and inputted descriptions thereof is extracted from the received snaplist file and then processed by the snaplist file processing module 186. In one aspect, the service provider device 180 is adapted to extract images and descriptions from the snaplist file as provided by the user 102 via the user device 120. As previously mentioned, the user device 120 is utilized by the user 102 to generate multiple image listings directly form the user device 120. The service provider device 180 is adapted to post (i e, make available) the user generated multiple image listings to the network 160 so that other users of the network 160 are able to view the user generated multiple image listings. As such, the user device 120 operates as a mobile phone camera with a network connection to create rich, multiple image listings directly from the user device 120 (e.g., mobile phone).

Next, the service provider device 180 is adapted to optionally obtain snaplist post authorization from the user 102 via the user device 120 (block 430). In one implementation, the service provider device 180 may prompt the user 102 to verify snaplist posting and/or provide authorization to post the multiple image listing to the network 160. The post authorization may be prompted after processing of the snaplist file and before actual posting of the multiple image listing so that the user 102 may provide authorization. In another implementation, the authorization may be provided in the user login request and/or the snaplist file itself as a standing authorization.

Next, the service provider device 180 is adapted to display the user authorized snaplisting (block 434). In one aspect, the multiple image listing, as provided by the user 102, is displayed (i.e., posted) on the network 160 for other network users to view. In another aspect, the service provider device 180 is adapted to monitor network user navigation and events as it relates to the multiple image listing. The service provider device 180 may be adapted to track network user selections as it relates to the multiple image listing by monitoring the multiple image listing. This navigation and tracking information may be provided to the user device 120 as update information related to the multiple image listing.

Figure 5:
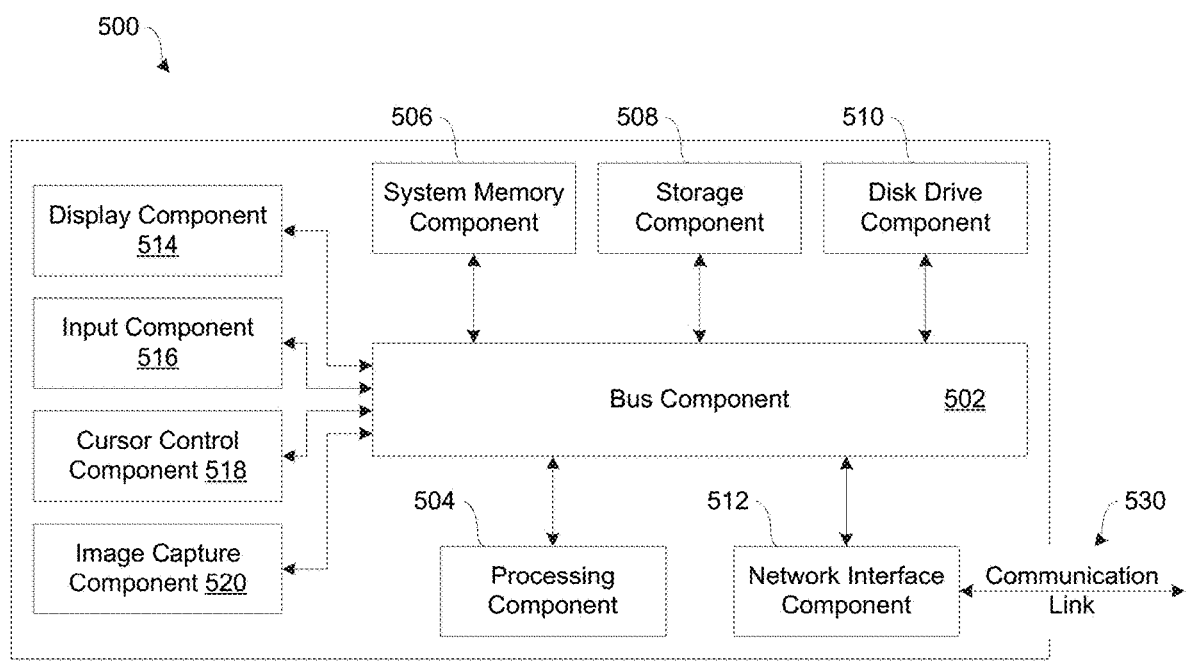
FIG. 5 is a block diagram of a computer system suitable for implementing one or more embodiments of the present disclosure.

FIG. 5 is a block diagram of a computer system 500 suitable for implementing one or more embodiments of the present disclosure, including the user device 120 and the service provider device 180. In various implementations, the user device 120 may comprise a mobile communication device (e.g., mobile cellular phone) capable of communicating with the network 160, and the service provider device 180 may comprise a network computing device, such as a network server. Hence, it should be appreciated that each of the devices 120, 180 may be implemented as computer system 500 in a manner as follows.

In accordance with various embodiments of the present disclosure, computer system 500, such as a mobile communication device and/or a network server, includes a bus 502 or other communication mechanism for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), cursor control component 518 (e.g., mouse or trackball), and image capture component 520 (e.g., digital camera). In one implementation, disk drive component 510 may comprise a database having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 530 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   providing a user interface to generate a multiple image listing for an item;
   receiving a first image of the item for the multiple image listing from a user device of a user, the first image captured by a digital camera of the user device;
   causing display of the first image in the user interface of the user device;
   receiving user input to select a portion of the first image displayed in the user interface;
   responsive to the user input to select the portion of the first image displayed in the user interface, causing the digital camera to capture a second image for the multiple image listing, wherein the first image and the second image are snapshots and the second image is different than the first image;
   receiving a textual description of the item for the multiple image listing; and
   generating the multiple image listing from the first image, the second image, and the textual description.

2. The method of claim 1, wherein the multiple image listing is stored in an account of the user, and wherein the account of the user is used to provide the multiple image listing for browsing by the other users.

3. The method of claim 2, wherein prior to the providing the interface, the method further comprises:
   receiving a login request to the account of the user, wherein the login request comprises authentication credentials for the account of the user; and
   authenticating the user for the account using the login request.

4. The method of claim 2, wherein the multiple image listing is provided on an electronic marketplace for access by the other users.

5. The method of claim 4, wherein the multiple image listing is associated with a sale of the item in the first image and the second image by the user, and wherein the electronic marketplace posts the item for sale using the multiple image listing.

6. The method of claim 5, wherein the textual description comprises a price of the item, and wherein the electronic marketplace posts the item for sale at the price in the textual description.

7. The method of claim 4, wherein prior to the multiple image listing being provided, for access by the other users, the method further comprises:
   receiving a post authorization by the user to post the multiple image listing on the electronic marketplace, wherein the providing the multiple image listing for access on the electronic marketplace occurs in response to the receiving the post authorization.

8. The method of claim 1, wherein the user device comprises a mobile phone, and the digital camera of the user device that captures the first image and the second image is a camera of the mobile phone.

9. The method of claim 1, wherein the causing display comprises causing display of the first image in the user interface along with a selectable symbol positioned over the portion of the first image.

10. The method of claim 1, further comprising adapting the portion of the first image after the first image is captured by the digital camera of the user device, the adapting enabling the portion of the first image to be selectable via user input.

11. The method of claim 1, wherein the user input to select the portion of the first image comprises touch input to tap the portion of the first image.

12. A system comprising:
   a non-transitory memory; and
   one or more hardware processors coupled to the non-transitory memory and configured to read instructions from the non-transitory memory to cause the system to perform operations comprising:
   providing a user interface to generate a multiple image listing for an item;
   receiving a first image of the item for the multiple image listing from a user device of a user, the first image captured by a digital camera of the user device;
   causing display of the first image in the user interface of the user device;
   receiving user input to select a portion of the first image displayed in the user interface;
   responsive to the user input to select the portion of the first image displayed in the user interface, causing the digital camera to capture a second image for the multiple image listing, wherein the first image and the second image are snapshots and the second image is different than the first image;
   receiving a textual description of the item for the multiple image listing; and
   generating the multiple image listing from the first image, the second image, and the textual description.

13. The system of claim 12, wherein the multiple image listing is stored in an account of the user, and wherein the account is used to provide the multiple image listing for browsing by the other users.

14. The system of claim 13, wherein prior to the providing the interface, the operations further comprise:
   receiving a login request to the account of the user, wherein the login request comprises authentication credentials for the account of the user; and
   authenticating the user for the account using the login request.

15. The system of claim 13, wherein the multiple image listing is provided on an electronic marketplace for access by the other users.

16. The system of claim 15, wherein the multiple image listing is associated with a sale of the item in the first image and the second image by the user, and wherein the electronic marketplace posts the item for sale using the multiple image listing.

17. The system of claim 16, wherein the textual description comprises a price of the item, and wherein the electronic marketplace posts the item for sale at the price in the textual description.

18. The system of claim 15, wherein prior to the multiple image listing being provided for access, the operations further comprise:
   receiving a post authorization by the user to post the multiple image listing on the electronic marketplace, wherein the providing the multiple image listing for access on the electronic marketplace occurs in response to the receiving the post authorization.

19. The system of claim 12, wherein the causing display comprises causing display of the first image in the user interface along with a selectable symbol positioned over the portion of the first image.

20. A method comprising:
receiving authentication credentials for an account of a user from a user device of the user;
authenticating the user for use of the account based on the authentication credentials;
providing an account interface to the user device, wherein the account interface comprises an option to generate a multiple image listing for an item;
receiving a file comprising a first image of the item and a second image of the item for the multiple image listing, wherein the first image and the second image are snapshots and the second image is different than the first image, the first image and the second image captured by a digital camera of the user device, the second image captured by the digital camera of the user device in response to user input to select the corresponding portion of the item depicted in the first image;
receiving a textual description for the item;
generating the multiple image listing from the first image, the second image, and the textual description; and
providing the multiple image listing for access by other users.

* * * * *